United States Patent
Murayama et al.

(10) Patent No.: US 6,759,484 B1
(45) Date of Patent: Jul. 6, 2004

(54) METHOD OF DIMINISHING ODOR EMISSION

(75) Inventors: Toshikazu Murayama, Yokkaichi (JP); Harufumi Hagino, Yokkaichi (JP); Akihiro Gonno, Yokkaichi (JP); Nobuko Kinoshita, Yokkaichi (JP)

(73) Assignee: Kyowa Yuka Co., Ltd., Tokyo (JP)

( * ) Notice: Subject to any disclaimer, the term of this patent is extended or adjusted under 35 U.S.C. 154(b) by 129 days.

(21) Appl. No.: 10/089,191
(22) PCT Filed: Oct. 2, 2000
(86) PCT No.: PCT/JP00/06819
§ 371 (c)(1), (2), (4) Date: Mar. 27, 2002
(87) PCT Pub. No.: WO01/23447
PCT Pub. Date: Apr. 5, 2001

(30) Foreign Application Priority Data

Sep. 30, 1999 (JP) .......... 11-277733

(51) Int. Cl.⁷ .................. C08F 8/00
(52) U.S. Cl. .......... 525/385; 524/114; 525/327.2; 549/30
(58) Field of Search .............. 525/385, 327.2; 524/114; 549/30

(56) References Cited

U.S. PATENT DOCUMENTS

| 4,851,499 A | 7/1989 | Rifi ............ 528/491 |
| 6,160,044 A | * 12/2000 | Jimbo et al. ........ 524/241 |
| 6,372,871 B1 | * 4/2002 | Jimbo et al. ........ 526/257 |

FOREIGN PATENT DOCUMENTS

| EP | 310 040 | 4/1989 |
| EP | 0 849 317 | 6/1998 |
| EP | 0 875 533 | 11/1998 |
| EP | 0 972 808 | 1/2000 |
| JP | 1-163239 | 6/1989 |
| JP | 8-302012 | 11/1996 |
| JP | 8-302013 | 11/1996 |
| JP | 10-182927 | 7/1998 |
| JP | 10-306175 | 11/1998 |
| WO | 98/45373 | 10/1998 |

* cited by examiner

*Primary Examiner*—Bernard Lipman
(74) *Attorney, Agent, or Firm*—Fitzpatrick, Cella, Harper & Scinto

(57) ABSTRACT

By allowing a compound having an epoxy group in a composition containing at least a polymer or compound having a five-membered ring dithiocarbonate group represented by the following general formula (I) and a nucleophilic reagent, or in a cured article obtained by curing the composition, it is possible to inhibit emission of odors from the composition or the cured article,

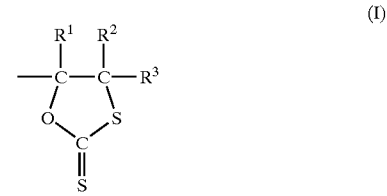

(I)

wherein $R^1$, $R^2$ and $R^3$ are the same or different and each represents a hydrogen atom or a lower alkyl group.

20 Claims, No Drawings

METHOD OF DIMINISHING ODOR EMISSION

TECHNICAL FIELD

The present invention relates to a method for inhibiting emission of odors from a composition containing a nucleophilic reagent and a polymer or compound having a five-membered ring dithiocarbonate(1,3-oxothiolane-2-thione) group, or a cured article obtained by curing the composition, which is useful in coating compositions, adhesives, inks, building sealants, semiconductor sealers, liners for civil engineering, optical materials, etc.; and a method for improving performances of the cured article.

This application is based on a patent application (Japanese Patent Application No. Hei 11-277733) filed in Japan, the content of which is incorporated herein by reference.

BACKGROUND ART

A polymer or compound having a five-membered ring dithiocarbonate group in a molecule is useful for various purposes. It is known that the polymer or compound is useful in coating compositions, adhesives, inks, building sealants, semiconductor sealers, liners used in civil engineering, optical materials, etc.

However, a composition itself containing a polymer or compound having a five-membered ring dithiocarbonate group and a nucleophilic reagent, and a cured article obtained by curing the composition have a problem in that an odor is emitted when it is heated to 60 to 80° C.

Japanese Patent Application Unexamined Publication No. Hei 9-59324 and WO98-45373 disclose compositions comprising a copolymer or compound having a five-membered ring dithiocarbonate group and a nucleophilic reagent. Both publciations also disclose optional addition of an epoxy resin to the composition comprising a copolymer or compound having a five-membered ring dithiocarbonate group and a nucleophilic reagent, and glycidyl(meth)acrylate as a monomer copolymerizable with a vinyl monomer having a five-membered ring dithiocarbonate group used in the preparation of a copolymer having a five-membered ring dithiocarbonate group, but do not describe an effect of inhibiting emission of odors.

Furthermore, Japanese Patent Application Unexamined Publication No. Hei 9-59324 discloses, in the examples, a vinyl-modified epoxy resin of a copolymer having a five-membered ring dithiocarbonate group. However, the publication does not describe an effect capable of inhibiting emission of odrs by modification with an epoxy resin.

Also, Japanese Patent Application Unexamined Publication No. Hei 8-302010 discloses that polythiourethane obtained by reacting a bifunctional five-membered ring dithiocarbonate compound with 1,ω-alkanediamine having 2 to 12 carbon atoms is useful as a curing agent of the epoxy resin.

Objects of the present invention are to provide a method for inhibiting emission of odors from a composition containing a nucleophilic reagent and a polymer or compound having a five-membered ring dithiocarbonate group, a cured article obtained by curing the composition, which is useful in coating compositions, adhesives, inks, building sealants, semiconductors sealers, liners for civil engineering, optical materials, etc.; and a method for improving performances of the cured article.

DISCLOSURE OF THE INVENTION

The method for inhibiting odors of the present invention is the method for inhibiting emission of odors comprising allowing a compound having an epoxy group to exist in a composition containing a nucleophilic reagent and at least a polymer or compound having a five-membered ring dithiocarbonate group represented by the following general formula (I), or in a cured article obtained by curing the composition,

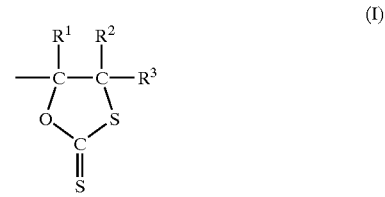

wherein $R^1$, $R^2$ and $R^3$ are the same or different and each represents a hydrogen atom or a lower alkyl group.

Further, by allowing the compound having an epoxy group to exist in the cured article, performances of the cured article can be improved. For example, in a cured article such as a coating film obtained by curing the composition, the hardness, strength, impact resistance, adhesion, water resistance, chemical resistance, weatherability, stain resistance, blocking resistance, or the like can be improved.

The present invention provides an inhibitor of emission of odors from a composition comprising a nucleophilic reagent and at least a polymer or compound having a five-membered ring dithiocarbonate group represented by the following general formula (I), or from a cured article obtained by curing the composition, and a performance improver for improving performances of the cured article. The inhibitor for emission of odors and the performance improver comprise a compound having an epoxy group.

The present invention provides a composition comprising a compound represented by the following general formula (III), a compound having an epoxy group, and a nucleophilic reagent,

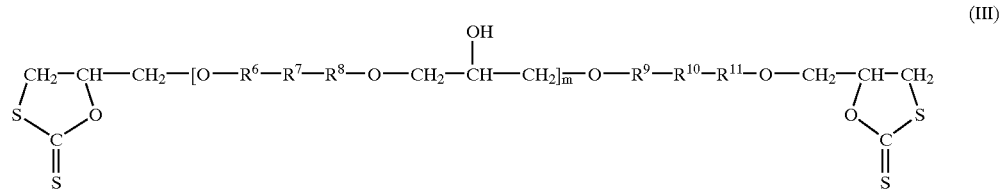

wherein $R^6$, $R^8$, $R^9$ and $R^{11}$ are the same or different and each represents phenylene or cyclohexylene, 1 to 4 hydrogen atoms of which may be substituted with a halogen atom, $R^7$ and $R^{10}$ are the same or different and each represents methylene, $C(CH_3)_2$, an oxygen atom, CO, a sulfur atom or $SO_2$, and m represents an integer of 0 to 40.

The present invention provides a compound having a five-membered ring dithiocarbonate group represented by the following general formula (IIIa).

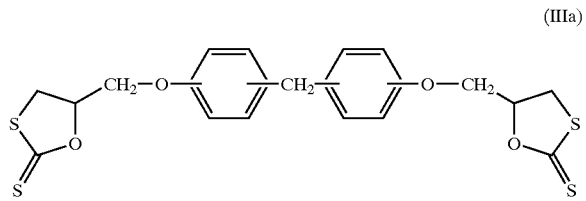

(IIIa)

BEST MODE FOR CARRYING OUT THE INVENTION

The present invention will now be described in detail.

In the definitions of the respective groups of the general formulas in the specification, the lower alkyl group includes, for example, a straight-chain or branched alkyl group having 1 to 6 carbon atoms, and is preferably an alkyl group having 1 to 4 carbon atoms.

Specific examples of the lower alkyl group include a methyl group, an ethyl group, a propyl group, an isopropyl group, a butyl group, isobutyl group, an s-butyl group, a t-butyl group, a pentyl group, an isopentyl group, a neopentyl group, and a hexyl group.

The polymer having a five-membered ring dithiocarbonate group represented by the general formula (I) includes, for example, a vinyl polymer, a polyester resin, an alkyd resin, a polyamide resin, polyether resin, a polyurethane resin, or a copolymer prepared by chemically bonding these resins, is preferably a copolymer, and is more preferably a vinyl copolymer. Specific examples thereof include a vinyl copolymer having a structural unit represented by the following general formula (II):

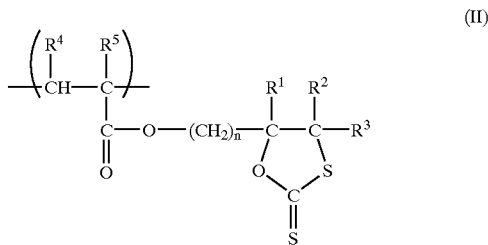

(II)

wherein $R^1$, $R^2$ and $R^3$ are as defined above, $R^4$ and $R^5$ are the same or different and each represents a hydrogen atom or a lower alkyl group, and n represents an integer of 1 to 4.

In the definitions of the respective groups of the general formula (II), the lower alkyl group includes, for example, the same as those described above, and is preferably a methyl group or an ethyl group.

Examples of the other vinyl monomer, which is copolymerized with the monomer having a five-membered ring dithiocarbonate group as a raw material of the vinyl copolymer having a five-membered ring dithiocarbonate group, include known vinyl monomers, for example:

(meth)acrylic adid;

alkyl(meth)acrylates obtained from an alcohol having 1 to 18 carbon atoms and (meth)acrylic acid, such as methyl (meth)acrylate, ethyl(meth)acrylate, butyl(meth)acrylate, isobutyl(meth)acrylate, t-butyl(meth)acrylate, cyclohexyl (meth)acrylate, 2-ethylhexyl(meth)acrylate, lauryl(meth) acrylate, and stearyl(meth)acrylate;

aromatic vinyl compounds such as styrene, α-methylstyrene, p-methylstyrene, dimethylstyrene, and divinylbenzene;

hydroxyalkyl(meth)acrylates such as 2-hydroxyethyl (meth)acrylate and 2-hydroxypropyl(meth)acrylate;

glycol di(meth)acrylates such as ethylene glycol di(meth) acrylate and butanediol di(meth)acrylate;

alkylaminoalkyl(meth)acrylates such as dimethylaminoethyl(meth)acrylate;

fluorine-containing vinyl monomers such as trifluoroethyl (meth)acrylate, pentafluoropropyl(meth)acrylate, perfluorocyclohexyl(meth)acrylate, 2,2,3,3-tetrafluoropropyl(meth)acrylate, and β-(perfluorooctyl)ethyl (meth)acrylate;

siloxane-containing vinyl monomers such as 1-[3-(meth) acryloxypropyl]-1,1,3,3,3-pentamethyldisiloxane, 3-(meth) acryloxypropyltris(trimethylsiloxane)silane, or AK-5 (silicone macromonomer, manufactured by TOA GOSEI KAGAKU Co., Ltd.);

hydrolyzable silyl group-containing vinyl monomerS such as vinyltrimethoxysilane, vinylmethyldimethoxysilane, 3-(meth)acryloxypropyltrimethoxysilane, 3-(meth) acryloxypropylmethyldimethoxysilane, 3-(meth) acryloxypropyltriethoxysilane, and 3-(meth) acryloxypropyldiethoxysilane;

vinyl ethers such as vinyl methyl ether, vinyl ethyl ether, and vinyl isobutyl ether; and polybasic unsaturated carboxylic acids such as fumaric acid, maleic acid, maleic anhydride, linseed oil fatty acid, tall oil fatty acid, and dehydrated castor oil fatty acid, or esters thereof with a monohydric or polyhydric alcohol, a dimethylaminoethyl(meth)acrylate methyl chloride salt, isobornyl(meth)acrylate, allyl alcohol, allyl alcohol esters, vinyl chloride, vinylidene chloride, trimethylolpropane tri (meth)acrylate, vinyl acetate, vinyl propionate, (meth) acrylonitrile, and macromonomer AS-6, AN-6, AA-6 and AB-6 (manufactured by TOA GOSEI KAGAKU Co., Ltd.) Among these monomers, alkyl esters of (meth)acrylic acid, for example, methyl(meth)acrylate, ethyl(meth)acrylate, butyl(meth)acrylate, isobutyl(meth)acrylate, t-butyl(meth) acrylate, and 2-ethylhexyl(meth)acrylate can be preferably used.

In the specification of the present application, "(meth) acrylic acid" means acrylic acid and methacrylic acid, and other (meth)acrylic acid derivatives are expressed in the same manner.

The vinyl polymer having a five-membered ring dithiocarbonate group can also be modified by bonding it to the other vinyl-free polymer. Examples thereof include a vinyl-modified polyester resin (Japanese Patent Application Unexamined Publication No. Hei 1-129072), a vinyl-modified alkyd resin, and a vinyl-modified urethane resin (Japanese Patent Application Unexamined Publication No. Hei 1-301761). These vinyl polymers can be prepared by known methods.

Preferred aspects of the method for inhibiting emission of odors from a composition containing a nucleophilic reagent and a polymer or compound having a five-membered ring dithiocarbonate group represented by the general formula (I), or a cured article obtained by curing the composition, comprising allowing a compound having an epoxy group to exist in the composition or the cured article and those of the method for improving performances of the cured article include:

(1) an aspect (hereinafter referred to as preferred aspect (1)) of incorporating a compound having an epoxy group, in addition to the polymer or compound having a five-membered ring dithiocarbonate group and a nucleophilic reagent, and (2) an aspect (hereinafter referred to as preferred aspect (2)) of incorporating the polymer or compound having a five-membered ring dithiocarbonate group and an epoxy group, and a nucleophilic reagent.

The following description includes both cases of preferred aspects (1) and (2), unless otherwise specified, and can be applied to all methods for inhibiting emission of odors and methods for improving performances.

The content (based on the monomer) of a structural unit having a five-membered ring dithiocarbonate group in the polymer having a five-membered ring dithiocarbonate group is preferably within a range from 0.2 to 90 mole %. Further, in preferred aspect (2), the content (based on the monomer) of a structural unit having an epoxy group is preferably within a range from 0.2 to 60 mole %.

The molecular weight of the polymer having a five-membered ring dithiocarbonate group is not specifically limited, but, for example, the weight-average molecular weight (Mw) is preferably within a range from 1,000 to 400,000, and more preferably within a range from 5,000 to 200,000, when using the above composition in oil-soluble coating compositions.

The method for preparing the polymer having a five-membered ring dithiocarbonate group will now be described.

The polymer having a five-membered ring dithiocarbonate group can be obtained by polymerizing or polycondensing a corresponding monomer according to a known method (radical polymerization, emulsion polymerization, or the like). The monomer having a five-membered ring dithiocarbonate group is obtained, for example, by reacting an oxirane compound with carbon disulfide in the presence of an alkali halide such as lithium bromide a manner similar to a known method (Japanese Patent Application Unexamined Publication No. Hei 5-247027; Journal of Organic Chemistry (J. Org. Chem.), 60,473(1995)).

The polymer having a five-membered ring dithiocarbonate group in a molecule can also be prepared by previously obtaining a polymer having a functional group (a carboxyl group, a hydroxyl group, an amino group, or the like) in a manner similar to a known method and bonding a compound having a five-membered ring dithiocarbonate group thereto in a pendant manner.

Examples of the method of preparing a polymer having a five-membered ring dithiocarbonate group and an epoxy group in preferred aspect (2) include a method of copolymerizing a vinyl monomer having a five-membered ring dithiocarbonate group and a vinyl monomer having an epoxy group, or the like as raw materials, or a method of preparing a vinyl polymer or a copolymer having a five-membered ring dithiocarbonate group, and modifying the polymer or copolymer by bonding it to a vinyl or vinyl-free epoxy resin. Examples of vinyl monomers having an epoxy group include a vinyl monomer obtained by reacting the compound shown in (i) or (ii) with epihalohydrin:

(i) a carboxylic acid having a polymerizable and unsaturated bond, such as acrylic acid, methacrylic acid, maleic acid, maleic anhydride, itaconic acid, itaconic anhydride, crotonic acid, fumaric acid, citraconic acid, linseed oil fatty acid, tall oil fatty acid, or dehydrated castor oil fatty acid, (ii) an alcohol or phenol having an unsaturated bond, such as 2-hydroxyethyl(meth)acrylate.

Modification of a vinyl polymer or copolymer having a five-membered ring dithiocarbonate group with a vinyl-free epoxy resin can be carried out, for example, according to the method described in Japanese Patent Application Unexamined Publication No. Sho 54-30249.

Examples of a method for preparing a copolymer having a five-membered ring dithiocarbonate group include a method of copolymerizing a monomer having a five-membered ring dithiocarbonate group in a molecule with the other copolymerizable monomer, a method of graft-copolymerizing a homopolymer or copolymer with the other monomer after synthesizing the homopolymer or copolymer, and a method of block-copolymerizing copolymers with each other after synthesizing the copolymers.

The polymerization reaction is carried out, for example, at 0 to 100° C. for 1 to 24 hours in the presence of a polymerization initiator in an amount within a range of from 0.5 to 5 mole % based on the monomer in the case of the radical polymerization of the vinyl monomer.

In the case of preparing a vinyl aqueous emulsion polymer, a monomer may be subjected to emulsion polymerization in water using an emulsifier and a polymerization initiator according to a known method (Japanese Patent Application Unexamined Publication No. Sho 54-110248; Japanese Patent Publication No. Sho 58-20991).

The storage stability of the polymer having a five-membered ring dithiocarbonate group can be improved by forming a core-shell structure. The core-shell type aqueous dispersion can be synthesized by a known method (Japanese Patent Application Unexamined Publication No. Sho 57-3850; Japanese Patent Application Unexamined Publication No. Sho 61-136501; Japanese Patent Application Unexamined Publication No. Hei 5-70733).

The polymer having a five-membered ring dithiocarbonate group can be emulsified in water by a known method.

Although the polymerization solvent varies depending on the polymerization form, there can be used, for example, benzene, toluene, xylene, hexane, cyclohexane, ethyl acetate, butyl acetate, acetone, methyl ethyl ketone, methyl isobutyl ketone, diisobutyl ketone, cyclohexanone, methanol, ethanol, propanol, isopropanol, butanol, N-methylpyrrolidone, tetrahydrofuran, acetonitrile, methoxybutanol, methoxybutyl acetate, 3-methyl-3-methoxybutanol, ethylene glycol monobutyl ether, ethylene glycol monobutyl ether acetate, diethylene glycol monobutyl ether, diethylene glycol monobutyl ether acetate, propylene glycol monomethyl ether, dipropylene glycol monomethyl ether, propylene glycol monoethyl ether, propylene glycol monomethyl ether acetate, dipropylene glycol monomethyl ether acetate, 3-methyl-3-methoxy-1-butyl acetate, water, dimethylformamide, dimethylacetamide, dimethyl sulfoxide, or the like in the radical polymerization. Although the amount of the solvent is not specifically limited, the solvent is usually used in a 0.2- to 100-fold amount based on the total monomer.

Although the polymerization initiator varies depending on the polymerization form, there can be used, for example, 2,2'-azobisisobutyronitrile, 2,2'-azobis-2-methylbutyronitrile, 2,2'-azobisvaleronitrile, benzoyl peroxide, acetyl peroxide, lauroyl peroxide, 1,1-bis(t-butylperoxy)-3,3,5-trimethylcyclohexane, t-butylperoxy 2-ethylhexanoate, cumen hydroperoxide, t-butylperoxy benzoate, t-butylperoxide, methyl ethyl ketone peroxide, m-chloroperbenzoic acid, or the like in the radical polymerization. Examples of the polymerization initiator used in the emulsion polymerization include an inorganic peroxide such as an ammonium salt, a sodium salt, or a potassium salt of persulfuric acid, or hydrogen peroxide; a redox polymerization initiator such as hydrogen peroxide/a ferrous salt, persulfate/acidic sodium sulfite, or cumen hydroperoxide/ N,N-dimethylaniline; a water-soluble azo compound such as 2,2'-azobis[2-methyl-N-(2-hydroxyethyl)propionamide], and the like. Although the amount of the polymerization initiator is not specifically limited, the polymerization initiator may be usually used in an amount of 0.5 to 5 mole % based on the total vinyl monomer.

isocyanurate, epoxidated soybean oil, or epoxidated soybean oil fatty acid with carbon disulfide. Among these compounds, a compound having a five-membered ring dithiocarbonate group represented by the following general formula (III) is preferably used.

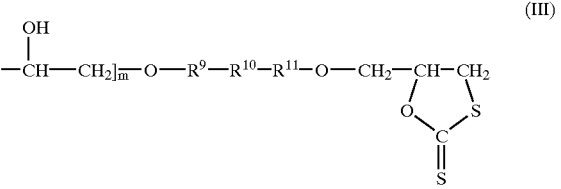

(III)

As the emulsifier for aqueous emulsion polymerization, there can be used, for example, an anionic emulsifier such as a salt of an alkylbenzenesulfonic acid; a nonionic emulsifier such as polyethylene glycol alkylphenyl ether; are active emulsifier such as Eleminol JS-2 (manufactured by Sanyo Kasei Co., Ltd.); or a polymeric emulsifier prepared by introducing a hydrophilic group such as a salt of a carboxylic acid or a salt of a sulfonic acid to a polymer such as a vinyl polymer or a polyester polymer. Although the amount of the emulsifier is not specifically limited, the emulsifier may be usually used in an amount of 0.1 to 10% by weight based on the total vinyl monomer. Various protective colloids for emulsification/stabilization such as polyvinyl alcohol and cellulose can also be used in combination.

Examples of the method for preparing an aqueous dispersion other than the aqueous emulsion polymerization include a self-emulsification method wherein a tertiary amine salt of a carboxylic acid is introduced in a molecule of a polymer, and an emulsification method using an external emulsifier.

The polymer having a five-membered ring dithiocarbonate group can also be obtained by reacting a polymer having an oxirane structure with carbon disulfide in the presence of an alkali halide such as lithium bromide in a manner similar to a known method (Japanese Patent Application Unexamined Publication No. Hei 5-247027; Journal of Organic Chemistry (J. Org. Chem.), 60, 473(1995)), in addition to the methods described above.

To chemically bond a vinyl polymer to a polyester resin, there may be used a method of previously synthesizing a vinyl polymer having a functional group such as a carboxyl group, a hydroxyl group, or a glycidyl group, and a polyester having a glycidyl group, a hydroxyl group, or a carboxyl group and bonding them by esterification (Japanese Patent Application Unexamined Publication No. Hei 1-129072), or a method of synthesizing an unsaturated polyester resin having a radical polymerizable functional group (a vinyl group or a conjugated double bond) and grafting a vinyl monomer by the radical polymerization.

The compound having a five-membered ring dithiocarbonate group will now be described.

Examples of the compound having a five-membered ring dithiocarbonate group include a five-membered ring dithiocarbonate compound derived from phenol, a five-membered ring dithiocarbonate compound derived from an alcohol, a five-membered ring dithiocarbonate compound derived from a carboxylic acid, and a compound obtained by reacting an oxirane compound such as a diphenylepoxy resin, ethylene oxide, propylene oxide, butylene oxide, triglycidyl wherein $R^6$, $R^8$, $R^9$ and $R^{11}$ are the same or different and each represents phenylene or cyclohexylene, 1 to 4 hydrogen atoms of which may be substituted with a halogen atom, $R^7$ and $R^{10}$ are the same or different and each represents methylene, $C(CH_3)_2$, an oxygen atom, CO, a sulfur atom or $SO_2$, and m represents an integer of 0 to 40.

Among compounds having a five-membered ring dithiocarbonate group represented by the general formula (III), compounds wherein $R^7$ and $R^{10}$ represent methylene are preferred and a compound having a five-membered ring dithiocarbonate group represented by the following general formula (IIIa) is more preferred.

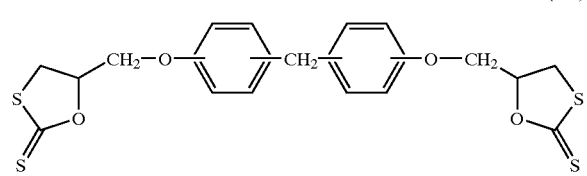

(IIIa)

The compound having a five-membered ring dithiocarbonate group represented by the general formula (IIIa) has a high solubility in a solvent and a high compatibility with a resin, also has a low viscosity when dissolved, and is superior in operatability.

In the definitions of the respective groups of the general formula (III), phenylene may be any of 1,2-phenylene, 1,3-phenylene and 1,4-phenylene. Examples of the halogen atom include a fluorine atom, a chlorine atom, a bromine atom, and an iodine atom. Among these atoms, a bromine atom is preferred.

Examples of the five-membered ring dithiocarbonate compound derived from phenol include compounds obtained by reacting a phenol compound such as resorcinol, hydroquinone, pyrocatechol, bisphenol A, dihydroxydiphenylmethane (bisphenol F), bisphenol S, tetrabromobisphenol A, 1,3-bis(4-hydroxyphenyl)cyclohexane, 4,4'-dihydroxy-3, 3'-dimethyldiphenylmethane, 4,4'-dihydroxybenzophenone, tris(4-hydroxyphenyl)methane, bis(4-hydroxyphenyl)ether, novolak phenol, novolak cresol, bis(4-hydroxyphenyl) sulfone, bis(3,5-dimethyl-4-hydroxyphenyl)sulfone, or a hydride or a halide of the above compound with epichlorohydrin to give a glycidyl ether, and further reacting the resulting glycidyl ether with carbon disulfide; and commercially available products such as Epikote 806, 807, 828 and 1001 to 1007, manufactured by Yuka Shell Epoxy Co., Ltd.

Examples of the five-membered ring dithiocarbonate compound derived from an alcohol include compounds obtained by reacting an alcohol such as methanol, ethanol, propanol, butanol, octanol, nonanol, isodecanol, ethylene glycol, propylene glycol, neopentyl glycol, glycerin, trimethylolpropane, pentaerythritol, dipentaerythritol, 2-butyl-2-ethyl-1,3-propanediol, 2,2-diethyl-1,3-propanediol, 3-methyl-1,5-pentanediol, 2,4-diethyl-1,5-pentanediol, or 1,9-nonandiol with epichlorohydrin to give a glycidyl ether and reacting the resulting glycidyl ether with carbon disulfide.

The five-membered ring dithiocarbonate compound derived from a carboxylic acid can be obtained by further reacting a glicidyl compound, which is obtained by reacting acetic acid, propionic acid, butyric acid, stearic acid, adipic acid, phthalic acid, or the like with epichlorohydrin, with carbon disulfide.

The other compounds having a five-membered ring dithiocarbonate group can also be obtained by reacting an oxirane compound corresponding to the desired product with carbondisulfide in the presence of an alkali halide such as lithium bromide in a manner similar to a known method (Japanese Patent Application Unexamined Publication No. Hei 9-59324; Journal of Organic Chemistry (J. Org. Chem.), 60, 473 (1995)).

For example, a hydroxy compound represented by the general formula (III) can be obtained by reacting a corresponding and commercially available epoxy resin (for example, Epikote 806, 807, 828 and 1001 to 1007, manufactured by Yuka Shell Epoxy Co., Ltd.) with carbon disulfide in the presence of an alkali halide such as lithium bromide in a manner similar to those described above. If the oxirane compound is not commercially available, the oxirane compound can be obtained by reacting a compound having a hydroxyl group with epichlorohydrin in the presence of a base using a known method [Williamson's ether synthesis or the like].

Examples of the method for preparing a compound having a five-membered ring dithiocarbonate group and an epoxy group in preferred aspect (2) include a method for preparing a compound having a five-membered ring dithiocarbonate group, which has a functional group, in a manner similar to the methods described above, and reacting the resulting compound with a compound having an epoxy group, which has a functional group reactable with the above functional group.

The nucleophilic reagent will now be described.

The nucleophilic reagent may be any one which is capable of nucleophilic reaction with a thiocarbonyl group of a five-membered ring dithiocarbonate group and includes, for example, a compound having an amino group, a hydroxyl group, an imino group, a thiol group, or the like. Among these compounds, a compound having an amino group (an amino compound) is preferred and a compound having two or more primary or secondary amino groups in a molecule is more preferred.

Examples of the compound having an amino group include:

lower-molecular weight compounds, for example, aliphatic primary or secondary amines such as ammonia, methylamine, ethylamine, propylamine, butylamine, hexylamine, octylamine, ethylenediamine, 1,2-diaminopropane, 1,3-diaminopropane, 1,4-diaminobutane, 1,6-diaminohexane, 1,8-diaminooctane, 4-aminomethyl-1,8-diaminooctane, dimer acid amide, an amine adduct of an epoxy resin, monoethanolamine, diethanolamine, 2-amino-2-methylpropanol, 1,2-diaminocyclohexane, N,N'-bis(2-aminoethyl)ethylenediamine, N,N'-bis(3-aminopropyl) ethylenediamine, N,N'-dimethyl-1,3-diaminopropane, N,N'-dimethyl-1,4-diaminobutane, N,N'-dimethyl-1,5-diaminopentane, N,N'-dimethyl-1,6-diaminohexane, N,N'-dimethyl-1,8-diaminooctane, N,N'-dimethyl-1,9-diaminononane, N,N'-dimethyl-1,12-diaminododecane, diethylenetriamine, triethylenetetramine, trisaminoethylamine, dimethylamine, diethylamine, diisopropylamine, and dicyandiamide;

alicyclic secondary amines such as pyrrolidine, piperidine, piperazine, morpholine, and thiomorpholine;

basic amino acids such as lysine, ornithine, and arginine;

aromatic amines such as aniline and diphenylamine;

aralkyl amines such as benzylamine; and basic nitrogen-containing heterocyclic compounds such as pyrrole, imidazole, and triazole;

homopolymers of a vinyl polymerizable monomer having an amino group in a molecule, such as (meth)acrylic acid monohydrazide, 2-aminoethyl(meth)acrylate, allylamine, N-methylallylamine, or diallylamine, or a copolymer of the vinyl polymerizable monomer and the other vinyl monomer;

hydrolysis products of a homopolymer of a monomer such as N-vinylformamide or N-vinylacetamide, or a copolymer of N-vinylformamide, N-vinylacetamide, or the like and the other vinyl monomer;

polyamine adducts of a polyepoxy compound; and amino protective compounds of these compounds having an amino group.

As the compound having an amino group, a polyamideamine or a derivative thereof may also be used.

Examples of the polyamideamine or derivative thereof include Lacquamide N-153, 966 (manufactured by DAIN-IPPON INK & CHEMICALS Co., Ltd.); Newmide 500, 515, 525, 540, 560, 825, 840, 1600, 1700, 1750, 2075 (manufactured by Harima Kasei, Inc.); Sunmide 300, 305, 315, 325, 328A, 330, 335E, 340, 1320, D-15A, X-13A, X963 (manufactued by Sanwa Kagaku Kogyo Co., Ltd.), TOMIDE #210, #215X, #225X, #235-A, #245-S, #275, #292, #2151, #2400 (manufactured by Fuji Kasei Kogyo Co., Ltd.); and a compound represented by the following general formula (IV):

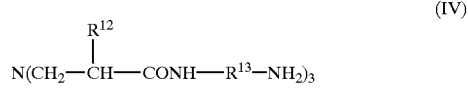

wherein $R^{12}$ represents a hydrogen atom, a methyl group or an ethyl group, and $R^{13}$ represents alkylene or phenylene.

The alkylene includes, for example, a straight-chain or branched alkylene having 2 to 16 carbon atoms and examples thereof include ethylene, propylene, butylene, pentylene, hexylene, heptylene, octylene, nonylene, decylene, and hexadecylene. Phenylene may be any of 1,2-phenylene, 1,3-phenylene and 1,4-phenylene.

The compound represented by the general formula (IV) can be synthesized by a known method (Angewante Chemie International Edition in English (Angew. Chem. Int. Ed.), 29,138(1990) or the like).

Specific examples of the derivative of a polyamideamine other than those mentioned above include PA-23 (manufactured by Ohtake Chemical Co., Ltd., amine value: 80 to 150) as an epoxy adduct obtained by adding an epoxy compound to a polyamide, and Adeka-HardnerEH-350 (manufactured by Asahi Denka K.K, amine value: 320 to 380) as a Mannich modified compound of a modified polyamide.

The amine value of the polyamideamine or derivative thereof is usually within a range from 50 to 1000, and preferably within a range from 80 to 500. When the amine value is within such a range, for example, balance between the drying property and the adhesion force tends to be improved when using a composition containing a polymer or compound having a five-membered ring dithiocarbonate group represented by the general formula (I), a polyamideamine or derivative thereof and a compound having an epoxy group in coating compositions, etc.

As the nucleophilic reagent for controlling the rate of the reaction between the five-membered ring dithiocarbonate group and the amino group, a compound having a primary or secondary amino group protected with a lower-molecular weight carbonyl compound (a ketimine derivative, an enamine derivative or an aldimine derivative) may be used. These compounds may be synthesized by a known method for synthesis of a ketimine, an aldimine or an enamine. A commercially available ketimine, aldimine or enamine (for example, Epicure H-2, manufactured by Yuka Shell Epoxy Co., Ltd.) may also be used. The lower-molecular weight carbonyl compound, which may be used as a protective agent for controlling the reaction rate of the amino group, is preferably a ketone compound having a boiling point of 150° C. or lower, such as acetone, methyl ethyl ketone, methyl isobutyl ketone, diisobutyl ketone, or cyclohexanone; or an aldehyde compound having a boiling point of 150° C. or lower, such as acetaldehyde, propionaldehyde, isobutylaldehyde, octylaldehyde, or (meth)acrolein. In the case of protecting the amino group, the lower-molecular weight carbonyl compound is usually used in an amount within a range from 0.5 to 5 equivalents, preferably within a range from 0.8 to 1.5 equivalents, based on the compound having an amino group, but may be used in an excess amount also as the solvent.

Examples of the compound having a hydroxyl group include alcohols such as methanol, ethanol, isopropanol, butanol, octanol, ethylene glycol, and polyethylene glycol; and water (containing hydroxy ions). For the purpose of enhancing the nucleophilicity of the compound having a hydroxyl group, a tertiary amine such as triethylamine or a basic compound such as sodium hydroxide may be added in an amount of 0.01 to 20 mole % based on the compound having a hydroxyl group.

In the preparation of the cured article, a curing catalyst may also be optionally added to promote the reaction between thiol groups produced from the five-membered ring dithiocarbonate group. Examples of the curing catalyst include Lewis acids such as aluminum chloride, iron chloride, zinc chloride, and lanthanum chloride; and solid acids which support various zeolite-based metals. The amount used is not specifically limited, but is within a range from 0.001 to 20% by weight based on the solid content of the composition.

In preferred aspect (1), a compound having an epoxy group is allowed to exist, in addition to the polymer or compound having a five-membered ring dithiocarbonate group and the nucleophilic reagent. The compound having an epoxy group includes, for example, an oxirane compound such as an epoxy compound derived from phenol, an epoxy compound derived from an alcohol, an epoxy compound derived from a carboxylic acid, an epoxy compound derived from an amine, a diphenylepoxy resin, ethylene oxide, propylene oxide, butylene oxide, triglycidyl isocyanurate, epoxidated soybean oil, or epoxidated soybean oil fatty acid, and a polymer having an epoxy group.

Examples of the epoxy compound derived from phenol include compounds obtained by reacting a phenol compound such as resorcinol, hydroquinone, pyrocatechol, bisphenol A, dihydroxydiphenylmethane (bisphenol F), bisphenol S, tetrabromobisphenol A, 1,3-bis(4-hydroxyphenyl)cyclohexane, 4,4'-dihydroxy-3,3'-dimethyldiphenylmethane, 4,4'-dihydroxybenzophenone, tris(4-hydroxyphenyl)methane, bis(4-hydroxyphenyl)ether, novolak phenol, novolak cresol, bis(4-hydroxyphenyl)sulfone, bis(3,5-dimethyl-4-hydroxyphenyl)sulfone, or a hydride or a halide of the above compounds with epichlorohydrin; and commercially available products such as Epikote 828 manufactured by Yuka Shell Epoxy Co., Ltd. and Epolite 40E manufactured by Kyoeisha Chemical Co., Ltd.

Examples of the epoxy compound derived from an alcohol include compounds obtained by reacting an alcohol such as methanol, ethanol, propanol, butanol, octanol, nonanol, isodecanol, ethylene glycol, diethylene glycol, polyethylene glycol, propylene glycol, tripropylene glycol, polypropylene glycol, neopentyl glycol, glycerin, trimethylolpropane, pentaerythritol, dipentaerythritol, sorbitol, 2-butyl-2-ethyl-1,3-propanediol, 2,2-diethyl-1,3-propanediol, 3-methyl-1,5-pentanediol, 2,4-diethyl-1,5-pentanediol, 1,6-hexanediol, or 1,9-nonandiol with epichlorohydrin.

Examples of the epoxy compound derived from a carboxylic acid include compounds obtained by reacting acetic acid, propionic acid, butyric acid, stearic acid, adipic acid, phthalic acid, or the like with epichlorohydrin.

Examples of the epoxy compound derived from an amine include compounds obtained by reacting diaminodiphenylmethane, p-aminophenol, xylylenediamine, m- or p-phenylenediamine, or diaminodiphenyl oxide, or the like with epichlorohydrin.

The compound having an epoxy group can be obtained in the form of a commercially available product or by reacting a compound having a corresponding hydroxyl group, carboxyl group or amino group with epichlorohydrin in the presence of a base using a known method (Williamson's ether synthesis or the like).

Examples of the compound having an epoxy group, which exists in preferred aspect (1), also include compounds having an epoxy group, such as n-butyl glycidyl ether, allyl glycidyl ether, 2-ethylhexyl glycidyl ether, styreneoxide, phenyl glycidyl ether, cresyl glycidyl ether, sec-butylphenyl glycidyl ether, glycidyl methacrylate, vinylcyclohexene monoepoxide, α-piene oxide, cardula E, diglycidyl ether, polyethylene glycol diglycidyl ether, polypropylene glycol diglycidyl ether, butanediol diglycidyl ether, vinylcyclohexene dioxide, neopentyl glycol diglycidyl ether, diglycidyl aniline, trimethylolpropane triglycidyl ether, and glycerin triglycidyl ether. The viscosity of the resulting composition can be controlled by using these compounds in combination with the compound having an epoxy group described above.

The polymer having an epoxy group is preferably a vinyl polymer and examples thereof include a polymer obtained by polymerizing a vinyl monomer having an epoxy group, such as glycidyl(meth)acrylate, and a polymer obtained by copolymerizing a vinyl monomer having an epoxy group with the other vinyl monomer having no epoxy group. Examples of the other vinyl monomer having no epoxy group include the same polymers as those described as for the other vinyl monomer which is copolymerized with the monomer having a five-membered ring dithiocarbonate group. The vinyl polymer having an epoxy group can be prepared in a manner similar to the above-described method for preparing the vinyl monomer having a five-membered ring dithiocarbonate group. In the polymer having an epoxy group, the content (based on the monomer) of a structural unit having an epoxy group is preferably within a range from 0.2 to 60 mole %. The weight-average molecular weight of the polymer having an epoxy group is not specifically limited, but is preferably within a range from 1,000 to 200,000 when used in oil-soluble coating compositions.

The compound having an epoxy group is used so that the amount of the epoxy group in the composition is preferably within a range from 0.05 to 50 equivalents, more preferably within a range from 0.5 to 20 equivalents, based on the five-membered ring dithiocarbonate group in the composition.

In preferred aspect (1), the polymer having a five-membered ring dithiocarbonate group may be a polymer also having an epoxy group or a polymer having no epoxy group.

In preferred aspect (1), the order of the addition, the method of the addition and the method of the incorporation of the nucleophilic reagent and the compound having an epoxy group into the polymer or compound having a five-membered ring dithiocarbonate group are not specifically limited.

In the composition obtained by carrying out the method of preferred aspect (1), (2), or the like (hereinafter also referred to as the above composition), when the polymer or compound having a five-membered ring dithiocarbonate group is reacted with the nucleophilic reagent, and from the cured article such as a coating film obtained by curing the composition, odor is scarcely emitted even when heated to 60 to 80° C. by being exposed to direct sunlight in the summer.

The present invention also provides an inhibitor of emission of odors from a composition containing a polymer or compound having a five-membered ring dithiocarbonate group and a nucleophilic reagent, or from a cured article obtained by curing the composition, comprising a compound having an epoxy group, and the respective conditions and the like in carrying out the invention can be set in a manner similar to that in the case of the conditions and the like stated in the explanation of preferred aspect (1).

The above composition may contain various solvents according to the purpose. As the solvent, for example, the above polymerization solvents can be used alone, or as a mixture of two to four kinds thereof in an amount of 0.2 to 100-fold (weight ratio) based on the polymer or compound having a five-membered ring dithiocarbonate group.

The above composition is useful in coating compositions, adhesives, inks, sealants, sealers, liners for civil engineering, optical materials, etc.

When using the composition in coating compositions, adhesives, inks, sealants, sealers, liners for civil engineering, optical materials, etc., it is usually used in the form of a solution or suspension. The solvent includes the polymerization solvents described above. With respect to timing of the addition of the solvent, the solvent may be added after synthesizing the polymer or compound having a five-membered ring dithiocarbonate group. When using the solvent for the polymerization or the like, it may be used for the above purposes as it is.

The above composition is usually used as a two-liquid type coating composition or adhesive, but can also be used as a one-liquid type coating composition or adhesive, or the like by converting the polymer or compound having a five-membered ring dithiocarbonate group into an aqueous dispersion such as an emulsion. Also when using, as the nucleophilic reagent, a ketimine, aldimine, or enamine derivative of an amino compound, it can be used as a one-liquid type coating composition or adhesive, or the like which is superior in storage stability.

The solution or suspension of the above composition itself can be used as a clear coating composition, clear ink, or the like, and can also be used as a colored coating composition, colored ink, or the like by further adding pigments, dispersed pigments, or the like thereto. Examples of the method of dispersing the pigment include a method of using a conventional high-speed stirrer such as a paint shaker or homodisper, ball mill, or the like.

If necessary, the above composition can contain various ultraviolet absorbers, antioxidants, hindered amine photostabilizers, pigment dispersants, or the like. Further, if necessary, the above composition may contain various conventionally used alkyd resins, acrylic resins, cellulose resins, petroleum resins, plasticizers, film forming auxiliaries, dehydrating agents, or the like.

When using the above composition in coating compositions, a conventional brush coating or spray coating method, or the like can be used as a coating method. The curing condition can be selected from various conditions including air-drying and heat-drying. Examples of the material to be coated include metals, lumber, plastics, inorganic materials, concrete, and asphalt. The composition of the present invention is useful for protection of materials, improvement in appearance, or the like as primers, topcoatings, one-coat primers, or the like.

The cured article obtained by curing the composition, such as a coating film, is superior in hardness, strength, adhesion, water resistance, chemical resistance, weatherability, stain resistance, blocking resistance, or the like. Thus, the present invention also provides a performance improver for a cured article obtained by curing a composition containing a polymer or compound having a five-membered ring dithiocarbonate group and a nucleophilic reagent, comprising a compound having an epoxy group and a method for improving performances of a cured article obtained by curing a composition comprising a polymer or compound having a five-membered ring dithiocarbonate group and a nucleophilic reagent, comprising allowing a compound having an epoxy group to exist in the cured article. The respective conditions and the like in carrying out the invention can be set in a manner similar to that in the case of the conditions and the like stated in the explanation of the method for inhibiting emission of odors and the inhibitor of odors.

Although the present invention also provides a composition comprising a compound represented by the general formula (III), a compound having an epoxy group, and a nucleophilic reagent, the method for preparation thereof, service conditions thereof and the like can be set in a manner similar to that in the case of the conditions and the like stated in the explanation of preferred aspect (1).

EXAMPLES

Reference Example 1

Synthesis of Resin (A-1)

In a flask equipped with a dripping apparatus, a stirrer, a thermometer, a cooling tube, and a nitrogen gas introducing tube, 150 g of toluene was charged and heated to 100° C. After replacing the atmosphere in the flask with nitrogen, a mixture of 12.0 g of 5-(methacryloyloxymethyl)-1,3-oxothiolane-2-thione, 92 g of butyl methacrylate, 20.5 g of butyl acrylate, 15 g of styrene, 10.5 g of 2-hydroxyethyl methacrylate and 0.5 g of 2,2'-azobis-2-methylbutyronitrile as a polymerization catalyst was added dropwise at the same temperature over 2 hours. After the completion of the dropwise addition, polymerization was completed by holding at 100° C. for 3 hours to obtain a resin solution having a solid content of 50% by weight and a weight-average molecular weight of 42,000. The weight-average molecular weight was analyzed by gel permeation chromatography (GPC) in the following procedure. With respect to the following Reference Examples, analysis was carried out in the same manner.

GPC analysis conditions

Column: TSKgel Super HM-M×2 columns and HM-H×1 column (manufactured by Toso Co., Ltd.) were connected in series.

Column retention temperature: 40° C.

Detector: RI

Developing solvent: tetrahydrofuran (flow rate: 0.5 ml/min.)

Reference material: polystyrene

Reference Example 2

Synthesis of Resin (A-2)

In a flask equipped with a dripping apparatus, a stirrer, a thermometer, a cooling tube, and a nitrogen gas introducing tube, 150 g of toluene was charged and heated to 100° C. After replacing the atmosphere in the flask with nitrogen, a mixture of 12.0 g of 5-(methacryloyloxy)methyl-1,3-oxothiolane-2-thione, 82.7 g of butyl methacrylate, 22.0 g of butyl acrylate, 15 g of styrene, 10.5 g of 2-hydroxyethyl methacrylate, 7.8 g of glycidyl methacrylate and 0.5 g of 2,2'-azobis-2-methylbutyronitrile as a polymerization catalyst was added dropwise at the same temperature over 2 hours. After the completion of the dropwise addition, polymerization was completed by holding at 100° C. for 3 hours to obtain a resin solution having a solid content of 50% by weight and a weight-average molecular weight of 49,000.

Reference Example 3

Synthesis of Resin (A-3)

In a flask equipped with the same apparatus as those in Reference Example 1, 340 ml of carbon disulfide was added dropwise to a solution, which was prepared by dissolving 500 g of bisphenol A epichlorohydrin type epoxy resin (Epikote 1001, manufactured by Yuka Shell Epoxy Co., Ltd.) and 25 g of lithium bromide in 5 L of tetrahydrofuran, at 25° C. and the mixture was reacted for 8 hours by raising an internal temperature to 45° C.

After the reaction, the reaction mixture was concentrated under reduced pressure and the resulting concentrated residue was partitioned by adding 5 L of chloroform and 3 L of water. The extracted organic layer was further partitioned by adding 5 L of saturated sodium chloride solution. After the resulting organic layer was dehydrated with 300 g of magnesium sulfate, chloroform was distilled off to obtain 445 g of a crude product. 400 g of the crude product was purified by silica gel column chromatography to obtain a purified product.

The analysis results of NMR and IR for the resulting purified product are shown below.

$^1$H-NMR(CDCl$_3$, δ ppm, 400 MHz): 1.63(s, 18H), 2.52(d, J=5.1 Hz, 2H), 3.73 (dd, J=7.1, 12.0 Hz, 2H), 3.78(dd, J=7.6, 8.0 Hz, 2H), 4.10(dd, J=5.6, 12.0 Hz, 4H), 4.13(dd, J=4.6, 8.0 Hz, 4H), 4.25(dd, J=5.6, 10.3 Hz, 2H), 4.30(dd, J=5.6, 10.3 Hz, 2H), 4.35(q, J=5.4 Hz, 2H), 5.42(m, 2H), 6.81(dd, J=1.7, 8.8 Hz, 6H), 6.83(dd, J=2.0, 8.8 Hz, 6H), 7.13(dd, J=1.5, 8.0 Hz, 12H)

IR(NaCl, cm$^{-1}$): 508, 1184, 1241, 1606, 3037, 3442

Reference Example 4

Synthesis of Resin (A-4)

In a flask equipped with a dripping apparatus, a stirrer, a thermometer, a cooling tube and a nitrogen gas introducing tube, 275 g of water was charged and heated to 70° C. After reaching the temperature reached 70° C., a portion (80 g) of a mixture of 12.2 g of 5-(methacryloyloxymethyl)-1,3-oxothiolane-2-thione, 201.5 g of butyl acrylate, 160.1 g of methyl methacrylate, 18.2 g of 2-hydroxyethyl methacrylate, 12.2 g of Hitenol N-08 (manufactured by DAI-ICHI KOGYO SEIYAKUCO,. LTD), 0.8 g of ammonium persulfate and 220 g of water was added thereto. After reaching a stable temperature of 70° C., the rest of the mixture was added there to dropwise over 2 hours. After the completion of the dropwise addition, 0.1 g of ammonium persulfate and 30 g of water were further added thereto and the mixture was held at 70° C. for 1 hour. After cooling, the pH was adjusted to 9 using a 29% aqueous ammonia solution to obtain a desired resin solution (A-4). The obtained resin solution had a solid content of 45% by weight and a viscosity of 170 cps.

Reference Example 5

Synthesis of Resin (A-5)

In a flask equipped with a dripping apparatus, a stirrer, a thermometer, a cooling tube and a nitrogen gas introducing tube, 10 g of the product obtained in Reference Example 3, 3.0 g of toluene, 0.6 g of ethylene glycol monobutyl ether, 1.0 g of nonionic emulsifier Emulgen 931 (manufactured by Kao Corp.) and 0.3 g of nonionic emulsifier Emulgen 930 (manufactured by Kao Corp.) were charged and the internal temperature was raised to 50° C. After the completion of uniform stirring, 18 g of water heated previously to 50° C. was added dropwise to the reaction mixture to obtain a resin solution (A-5) having a solid content of 34% by weight and a viscosity of 780 cps.

Reference Example 6

Synthesis of Enamine Derivative (B-1)

In a flask equipped with a stirrer, a thermometer, a Dean-Stark trap and a nitrogen gas introducing tube, 10 g of N,N'-dimethyl-1,6-diaminohexane, 68 g of cyclohexanone and 200 g of toluene were charged and heated under reflux in a nitrogen flow for 4 hours. By distilling off the solvent and unreacted raw materials from the resulting reaction solution under reduced pressure (40° C./1 mmHg), 21 g of the desired enamine derivative was obtained. FT-IR measurement of the resulting product was carried out. As a result, an absorption characteristic to —N=CH— was observed at 1643 cm$^{-1}$.

Example 1

20 g of the resin (A-1) obtained in Reference Example 1 and 1.4 g of Epikote 828 (manufactured by Yuka Shell Epoxy Co., Ltd.) were diluted with 7.1 g of toluene and uniformly dissolved. In the solution, 0.26 g of N,N'-dimethyl-1,6-diaminohexane was added to prepare a clear varnish (C-1).

Example 2

20 g of the resin (A-1) obtained in Reference Example 1 and 1.0 g of Epolite 40E (manufactured by Kyoei Chemical Co., Ltd.) were diluted with 6.5 g of toluene and uniformly dissolved. In the solution, 0.56 g of the enamine derivative (B-1) obtained in Reference Example 6 was added to prepare a clear varnish (C-2)

Example 3

20 g of the resin (A-2) obtained in Reference Example 2 and 0.7 g of Epikote 828 (manufactured by Yuka Shell Epoxy Co., Ltd.) were diluted with 6.0 g of toluene and uniformly dissolved. In the solution, 0.56 g of the enamine derivative (B-1) obtained in Reference Example 6 was added to prepare a clear varnish (C-3)

Example 4

10 g of the resin (A-3) obtained in Reference Example 3 and 0.7 g of Epikote 828 (manufactured by Yuka Shell Epoxy Co., Ltd.) were diluted with 10.7 g of toluene and uniformly dissolved. In the solution, 0.92 g of N,N'-dimethyl-1,3-diaminopropane was added to prepare a clear varnish (C-4).

Example 5

To 22.2 g of the resin (A-4) obtained in Reference Example 4, 1.7 g of the resin (A-5) obtained in Reference Example 5 and 0.7 g of Epikote 828 (manufactured by Yuka Shell Epoxy Co., Ltd.), 0.2 g of a 50% aqueous N,N'-dimethyl-1,6-diaminohexane solution was added to prepare an emulsion resin solution (C-5).

Example 6
Synthesis of Compound (IIIa)

In a flask equipped with a dripping apparatus, a stirrer, a thermometer, a cooling tube, and a nitrogen gas introducing tube, 230 ml of carbon disulfide was added dropwise to a solution, which was prepared by dissolving 500 g of bisphenol F epichlorohydrin type epoxy resin (Epikote 806, manufactured by Yuka Shell Epoxy Co., Ltd.) and 14.8 g of lithium bromide in a mixture of 440 ml of methyl ethyl ketone and 440 ml of ethyl acetate, at 25° C. and the mixture was reacted at the same temperature for 6 hours.

After the reaction, 350 mL of water and 10 ml of HCl (1 mol/L) were added to the reaction mixture and 300 mL of a saturated sodium chloride solution and acetone were further added thereto for partitioning. After the resulting organic layer was dehydrated with 50 g of magnesium sulfate, the solvent was distilled off to obtain 733 g of a crude product. 700 g of the crude product was purified by silica gel column chromatography to obtain a purified product.

The analysis results of NMR and IR for the resulting purified product are shown below.

$^1$H-NMR(CDCl$_3$, δ ppm, 400 MHz): 3.54(m, 2H), 3.76 (m, 2H), 3.91(m, 2H), 4.28 (m, 4H), 5.42(m, 2H), 6.83(m, 4H), 7.10(m, 4H), IR(NaCl, cm$^{-1}$) 752, 1188, 1242, 1508, 1608, 2922

Comparative Example 1

20 g of the resin (A-1) obtained in Reference Example 1 was diluted with 5 g of toluene and 0.56 g of the enamine derivative (B-1) obtained in Reference Example 6 was added thereto to prepare a clear varnish (C-6).

Comparative Example 2

10 g of the resin (A-4) obtained in Reference Example 4 was diluted with 10 g of toluene and 0.92 g of N,N'-dimethyl-1,3-diaminopropane was added thereto to prepare a clear varnish (C-7).

Comparative Example 3

To 22.2 g of the resin (A-3) obtained in Reference Example 3, 0.2 g of a 50% aqueous solution of N,N'-dimethyl-1,6-diaminohexane was added to prepare a clear varnish (C-8).

Test Example 1

Each of the resin solutions prepared in Examples 1 to 4 and Comparative Examples 1 and 2 was applied on a polished zinc phosphate treated steel plate (manufactured by Nippon Test Panel K. K.) and a glass plate after about 5 minutes had passed since the incorporation of diamine or a derivative thereof, while each of the resin solutions prepared in Example 5 and Comparative Example 3 was applied on a polished zinc phosphate treated plate and a glass plate after about 3 hours had passed since the incorporation of a diamine in a dry film thickness of 30 micron using an applicator.

Each test sample was made by drying the film at 23° C. for 7 days and the obtained coating film was evaluated by examining the odor and performances (hardness, adhesion, impact resistance) thereof when heated to 80° C.

Sensory test of the odor: A coating film (1 g) was put in a 500 ml sealed bottle and the bottle was stored in a thermostat at 80° C. for 3 hours, and then the odor was evaluated by a sensory test.

Pencil hardness: This test was carried out by a hand-scratching test in accordance with JIS K5400 (General Test Procedure for Coating Composition)

Adhesion: This test was carried out by a checkers test in accordance with JIS K5400 (General Test Procedure for Coating Composition)

Impact resistance: In accordance with JIS K5400 (General Test Procedure for Coating Composition), using a Du Pont impact test machine, the impact resistance was judged by evaluating a drop height at which peeling or scratching occurs in a coating film when a weight (1 kg) is dropped onto the coating film.

The results are shown in Table 1 and Table 2.

TABLE 1

| | | (Sensory test for odor) | | |
|---|---|---|---|---|
| Clear varnish | Resin | Compound having an epoxy group | Nucleophilic reagent (diamine) | Sensory test |
| C-1 | A-1 | E-1 (2 equivalents) | ② | 0 |
| C-2 | A-1 | E-2 (2 equivalents) | ③ | 0 |
| C-3 | A-2 | E-1 (1 equivalent) A-2 | ③ | 0 |
| C-4 | A-3 | E-1 (2 equivalents) | ① | 1 |
| C-5 | A-4 A-5 | E-1 (2 equivalents) | ② | 0 |
| C-6 | A-1 | None | ③ | 3 |
| C-7 | A-4 | None | ① | 3 |
| C-8 | A-3 | None | ② | 2 |

Evaluation criteria for sensory test:
0: almost no odor
1: slight odor
2: strong odor
3: very strong odor
Nucleophilic reagent
①: N,N'-dimethyl-1,3-diaminopropane
②: N,N'-dimethyl-1,6-diaminohexane
③: enamine derivative (B-1) obtained in Reference Example 6
Compound having an epoxy group
E-1: Epikote 828 (manufactured by Yuka Shell Epoxy Co., Ltd.)
E-2: Epolite 40E (manufactured by Kyoeisha Kagaku Co., Ltd.)
Each equivalent in the parentheses denotes an equivalence of E-1 or E-2 as an epoxy group based on a five-membered ring dithiocarbonate group.

TABLE 2

(Evaluation of performances of coating film)

|  | Examples 1 to 3 | | | Comparative Example 1 |
|---|---|---|---|---|
| Clear varnish | C-1 | C-2 | C-3 | C-6 |
| Resin | A-1 | A-1 | A-2 | A-1 |
| Compound having an epoxy group | E-1 (2 equivalents) | E-2 (2 equivalents) | E-1 (1 equivalent) A-2 | None |
| Nucleophilic reagent (diamine) | ② | ③ | ③ | ③ |
| Pencil hardness | H | H | 2H | H |
| Adhesion | 100/100 | 100/100 | 100/100 | 0/100 |
| Impact resistance | 20 cm | 50 cm | 30 cm | ≦ 5 cm |

Notation with respect to a compound having an epoxy group and a nucleophilic reagent (diamine) is the same as that in Table 1.

Table 1 shows that the method for inhibiting emission of odors and the inhibitor of emission of odors of the present invention are effective, while Table 2 shows that performances (impact resistance and adhesion) of the coating film are improved by the method for improving performances of the cured article and the performance improver of the present invention.

Industrial Applicability

According to the present invention, there are provided a method for inhibiting emission of odors from a composition containing a polymer or compound having a five-membered ring dithiocarbonate group and a nucleophilic reagent, or a cured article obtained by curing the composition, comprising allowing a compound having an epoxy group to exist in the composition or the cured article, and a method for improving performances of the cured article.

According to the present invention, there are also provided an inhibitor of emission of odors from a composition containing a polymer or compound having a five-membered ring dithiocarbonate group and a nucleophilic reagent, or a cured article obtained by curing the composition, comprising a compound having an epoxy group, and a performance improver for the cured article.

What is claimed is:

1. A method for inhibiting emission of odors from a composition containing at least a polymer or compound having a five-membered ring dithiocarbonate group represented by the following general formula (I) and a nucleophilic reagent, or a cured article obtained by curing the composition, comprising allowing a compound having an epoxy group to exist in the composition or the cured article,

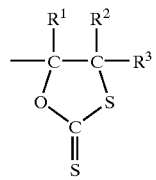

wherein $R^1$, $R^2$ and $R^3$ are the same or different and each represents a hydrogen atom or a lower alkyl group.

2. The method for inhibiting emission of odors according to claim 1, comprising allowing a compound having an epoxy group to exist in the composition or the cured article, in addition to the polymer or compound having a five-membered ring dithiocarbonate group and the nucleophilic reagent.

3. The method for inhibiting emission of odors according to claim 1, wherein the polymer or compound having a five-membered ring dithiocarbonate group and the compound having an epoxy group are the same and have a polymer or compound having a five-membered ring dithiocarbonate group represented by the general formula (I) mentioned above and an epoxy group.

4. The method for inhibiting emission of odors according to any one of claims 1 to 3, wherein the polymer having a five-membered ring dithiocarbonate group is a copolymer.

5. The method for inhibiting emission of odors according to claim 4, wherein the copolymer is a vinyl copolymer.

6. The method for inhibiting emission of odors according to claim 5, wherein the vinyl copolymer is a vinyl copolymer having a structural unit represented by the following general formula (II),

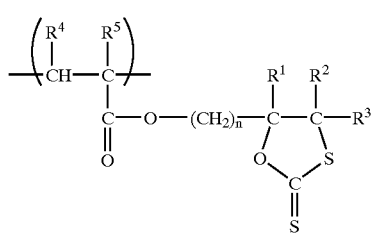

wherein $R^1$, $R^2$ and $R^3$ are as defined above, $R^4$ and $R^5$ are the same or different and each represent s a hydrogen atom or a lower alkyl group, and n represents an integer of 1 to 4.

7. The method for inhibiting emission of odors according to claim 1 or 2, wherein the compound having a five-membered ring dithiocarbonate group is a compound represented by the following general formula (III),

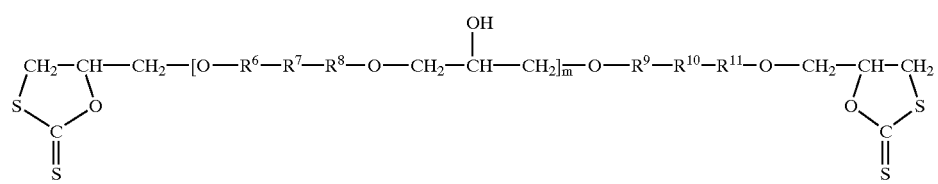

wherein $R^6$, $R^8$, $R^9$ and $R^{11}$ are the same or different and each represents phenylene or cyclohexylene, 1 to 4 hydrogen atoms of which may be substituted with a halogen atom, $R^7$ and $R^{10}$ are the same or different and each represents methylene, $C(CH_3)_2$, an oxygen atom, CO, a sulfur atom or $SO_2$, and m represents an integer of 0 to 40.

8. The method for inhibiting emission of odors according to any one of claims 1 to 3, wherein the nucleophilic reagent is any one selected from the group consisting of an amino compound, a ketimine derivative of the amino compound, an enamine derivative of the amino compound, and an aldimine derivative of the amino compound.

9. An inhibitor of emission of odors from a composition containing at least a polymer or compound having a five-membered ring dithiocarbonate group represented by the following general formula (I) and a nucleophilic reagent, or a cured article obtained by curing the compositiion, comprising a compound having an epoxy group,

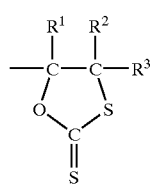
(I)

wherein $R^1$, $R^2$ and $R^3$ are the same or different and each represents a hydrogen atom or a lower alkyl group.

10. A performance improver for a cured article obtained by curing a composition containing at least a polymer or compound having a five-membered ring dithiocarbonate group represented by the following general formula (I) and a nucleophilic reagent, comprising a compound having an epoxy group,

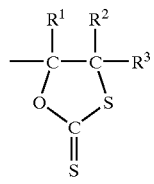
(I)

wherein, $R^1$, $R^2$ and $R^3$ are the same or different and each represents a hydrogen atom or a lower alkyl group.

11. The performance improver according to claim 10, which is an improver of impact resistance.

12. The performance improver according to claim 10, which is an improver of adhesion.

13. A method for improving performances of a cured article obtained by curing a composition containing at least a polymer or compound having a five-membered ring dithiocarbonate group represented by the following general formula (I) and a nucleophilic reagent, comprising allowing a compound having an epoxy group to exist in the cured article,

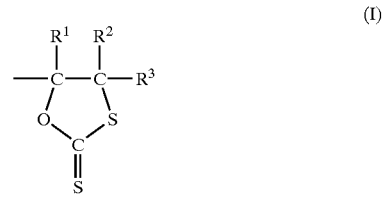
(I)

wherein $R^1$, $R^2$ and $R^3$ are the same or different and each represents a hydrogen atom or a lower alkyl group.

14. The method for improving performances according to claim 13, which is a method for improving impact resistance.

15. The method for improving performances according to claim 13, which is a method for improving adhesion.

16. A composition comprising a compound represented by the following general formula (III), a compound having an epoxy group, and a nucleophilic reagent,

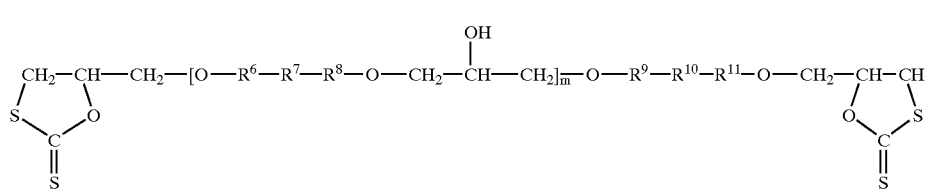
(III)

wherein $R^6$, $R^8$, $R^9$ and $R^{11}$ are the same or different and each represents phenylene or cyclohexylene, 1 to 4 hydrogen atoms of which may be substituted with a halogen atom, $R^7$ and $R^{10}$ are the same or different and each represents methylene, $C(CH_3)_2$, an oxygen atom, CO, a sulfur atom or $SO_2$, and m represents an integer of 0 to 40.

17. The composition according to claim 16, wherein $R^7$ and $R^{10}$ in the formula of the compound represented by the above-described general formula (III) represent methylene.

18. The composition according to claim 16, wherein the compound represented by the general formula (III) is a compound represented by the following general formula (IIIa).

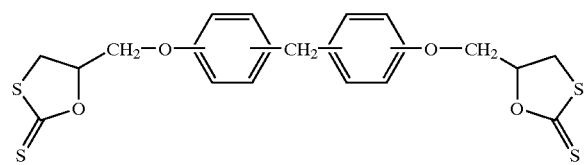
(IIIa)

19. The composition according to anyone of claims 16 to 18, wherein the nucleophilic reagent is an amino compound.

20. A compound having a five-membered ring dithiocarbonate group, which is represented by the following general formula (IIIa).

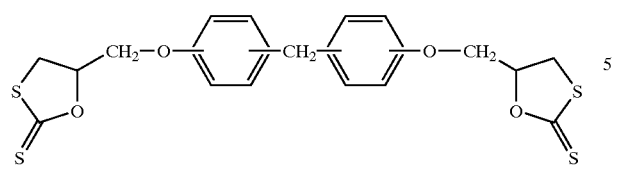
(IIIa)
* * * * *

UNITED STATES PATENT AND TRADEMARK OFFICE
CERTIFICATE OF CORRECTION

PATENT NO. : 6,759,484 B1
DATED : July 6, 2004
INVENTOR(S) : Toshikazu Murayama et al.

It is certified that error appears in the above-identified patent and that said Letters Patent is hereby corrected as shown below:

Column 1,
Line 59, "odrs" should read -- odors --.

Column 2,
Line 6, "semiconductors" should read -- semiconductor --.

Column 3,
Line 25, "group, isobutyl" should read -- group, an isobutyl --; and
Line 61, "adid;" should read -- acid; --.

Column 4,
Line 20, "monomerS" should read -- monomers -- ; and
Line 36, "Ltd.)" should read -- Ltd.). --.

Column 5,
Line 34, "bromide a" should read -- bromide in a --.

Column 7,
Line 22, "are active" should read -- a reactive --.

Column 8,
Line 44, "operatability" should read -- operability --.

Column 12,
Line 40, "styreneoxide" should read -- styrene oxide --.

Column 15,
Line 67, "reaching" should be deleted.

Column 16,
Line 5, "SEIYAKUCO,. LTD)," should read -- SEIYAKU CO., LTD.), --;
Line 8, "there to" should read -- thereto --; and
Line 60, "varnish (C-2)" should read -- varnish (C-2). --.

Column 17,
Line 2, "varnish (C-3)" should read -- varnish (C-3). --;
Line 26, "(Epikote 806, manu-" should read -- Epikote 806 (manu- --; and
Line 44, "IR(NaCl, cm$^{-1}$)" should read -- IR(NaCl, cm$^{-1}$): --.

UNITED STATES PATENT AND TRADEMARK OFFICE
CERTIFICATE OF CORRECTION

PATENT NO. : 6,759,484 B1
DATED : July 6, 2004
INVENTOR(S) : Toshikazu Murayama et al.

It is certified that error appears in the above-identified patent and that said Letters Patent is hereby corrected as shown below:

Column 18,
Lines 25 and 29, "Composition)" should read -- Composition). --.

Column 20,
Line 47, "represent s" should read -- represents --.

Column 21,
Line 14, "compositiion," should read -- composition, --.

Signed and Sealed this

Second Day of November, 2004

JON W. DUDAS
*Director of the United States Patent and Trademark Office*